United States Patent [19]
Emori et al.

[11] Patent Number: 5,263,512
[45] Date of Patent: Nov. 23, 1993

[54] FLUID CONTROL VALVE DEVICE

[75] Inventors: Yasuyoshi Emori; Yukimitsu Minamibata, both of Saitama, Japan

[73] Assignee: Jidosha Kiki Co., Ltd., Japan

[21] Appl. No.: 989,774

[22] Filed: Dec. 14, 1992

[30] Foreign Application Priority Data

Dec. 13, 1991 [JP] Japan .................................. 3-351378

[51] Int. Cl.$^5$ ................................................ F15B 9/10
[52] U.S. Cl. .............................. 137/625.23; 91/375 A; 137/625.24
[58] Field of Search ................. 91/375 A; 137/625.23, 137/625.24

[56] References Cited

U.S. PATENT DOCUMENTS 4,458,580  7/1984  Masuda et al. .
4,460,016  7/1984  Haga et al. .

FOREIGN PATENT DOCUMENTS 57-160769  10/1982  Japan .
57-178971  11/1982  Japan .
61-287862  12/1986  Japan .
63-30613   8/1988   Japan .

*Primary Examiner*—Gerald A. Michalsky
*Attorney, Agent, or Firm*—Blakely, Sokoloff, Taylor & Zafman

[57] ABSTRACT

In each of both ends of a land portion provided between channels which are formed in a slidable contact surface of a rotor assembled in a sleeve so as to be rotationally displaceable relative to the sleeve and thus control connection and disconnection of fluid paths, a chamfer is formed from an edge to a throttling action end portion of the land portion of the rotor so as to have at least one flat acting surface and a curved acting surface continuously connected to the flat acting surface. The curved acting surface of the chamfer is formed to have a smooth, continuously curved surface with a radius of curvature which decreases gradually from a connection portion with respect to the flat acting surface to a point at which it is connected to an outer diameter portion of the rotor. When a throttling action is performed by rotationally displacing the rotor with respect to the sleeve, an angle defined between the flat and curved acting surfaces at a connection point between them and an angle defined between the curved acting surface and a tangent at a point at which the curved acting surface is connected to the outer diameter portion of the rotor are maintained small, which reduces fluid noise caused by cavitation.

3 Claims, 5 Drawing Sheets

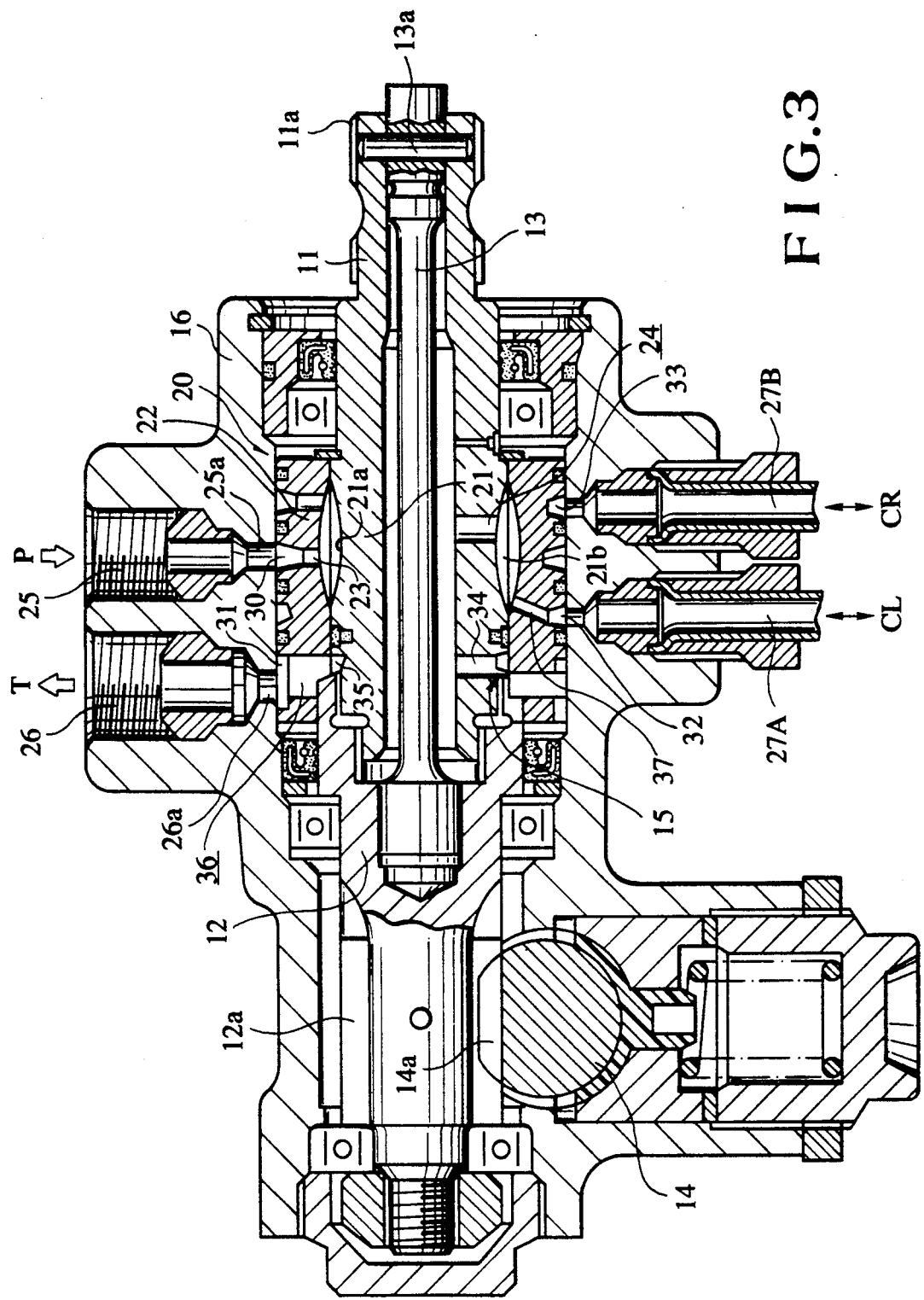
F I G. 3

FLUID CONTROL VALVE DEVICE

BACKGROUND OF THE INVENTION

The present invention relates to a fluid control valve device and, more particularly, to a rotary fluid control valve device for controlling distribution of a fluid pressure by means of a relative rotational displacement between a rotor and a sleeve.

In a hydraulic power steering apparatus for reducing a force required to rotate a steering wheel of an automobile, for example, a fluid control valve device is used as a rotary flow path switching valve. This fluid control valve device is used to operate a power cylinder as a moving part in a power steering apparatus in accordance with a steering operation, thereby generating an auxiliary steering force in the steering operation. Examples of such a conventional fluid control valve device are disclosed in Japanese Patent Laid-Open No. 57-178971 and Japanese Utility Model Publication No. 63-30613.

In a flow path switching valve of this type, a rotor provided integrally with an input shaft (stub shaft) coupled to a steering wheel and a sleeve provided integrally with an output shaft (pinion shaft) coupled to wheels to be steered are so assembled as to rotationally displace relative to each other and placed in a valve housing.

A plurality of channels formed in the outer circumferential surface of the rotor and the inner circumferential surface of the sleeve in the direction of circumference are connected to passages communicating with an oil pump as a fluid pressure generating source, an oil tank, and left and right cylinder chambers constituting a power cylinder. Consequently, switching between flow paths of a fluid pressure circuit (hydraulic circuit) can be performed easily and properly, and there is another advantage that the arrangement is simple.

One problem taking place when the above rotary fluid control valve device is used as a flow path switching valve or the like in a power steering apparatus is that in the hydraulic circuit from the pump to the left and right cylinder chambers or the tank through the pressure oil passages in the flow path switching valve, vortex flows or turbulent flows are produced in a flow of pressure oil in the pressure oil passages consisting of the channels and land portions formed in the rotor and the sleeve constituting the control valve and passage holes formed in these portions. This leads to a noise problem that fluid noise, such as so-called hiss noise, is generated due to cavitation.

Such a problem occurs for the reason explained below. That is, the cross section of a flow path defined between the edge of the land portion of the sleeve and a throttle portion (chamfer portion) provided in the rotor, which are throttled gradually and shut off eventually by the relative rotational displacement between the rotor and the sleeve, is decreased in accordance with an amount of rotational displacement. This increases the pressure of a fluid (pressure oil) to be controlled passing through this portion. On the other hand, the flow rate in this portion also increases, and the result is that the fluid (pressure oil) burbles from the circumferential wall of the land portion on the throttle side in accordance with the shape of the throttle portion, thereby generating vortex flows or turbulent flows.

In particular, if a wide or narrow portion or a bent portion is present in the throttle portion to be narrowed or widened in the flow path through which the pressure oil flows, vortex flows or turbulent flows are readily generated, and this results in easy production of fluid noise. Hence, to reduce these portions as few as possible is one technical objective required to be achieved in flow path switching valves of this type.

Of course, various countermeasures have been made conventionally in flow path switching valves of the above sort in order to solve the above noise problem.

For example, Japanese Patent Laid-Open No. 57-160769 or 61-287862 discloses a structure in which a chamfer portion of a rotor, which serves as a throttle portion, is formed as a multistage chamfer portion constituted by at least two acting surfaces with different inclination angles, so that changes in the cross section of a flow path in the direction of a flow, formed by the edge of a land portion of a sleeve and the chamfer portion, are decreased as small as possible.

In this conventional multistage chamfer structure, however, as is apparent from FIG. 6 and FIGS. 7A and 7B, an angle $\theta_1$ defined between a first acting surface $5a$ and a second acting surface $5b$, which constitute the multistage chamfer portion, and an angle $\theta_2$ defined between the second acting surface $5b$ and a tangent $1$ at a point at which the second acting surface $5b$ and the outer diameter portion of a rotor $1$ connect together, are large. Therefore, the fluid burble phenomenon described above cannot be avoided on the downstream side of the throttle portion, and this introduces the fluid noise problem caused by cavitation.

In FIGS. 6, 7A, and 7B, reference numeral $1$ denotes a rotor; $2$, a channel of the rotor $1$; $3$, a land portion adjacent to the point at which the second acting surface $5b$ is connected to the outer diameter portion of the rotor $1$, i.e., adjacent to the end of the throttle portion and continuous to the outer diameter portion of the rotor $1$; $4$, an edge of the rotor $1$ formed between the first acting surface $5a$ adjacent to the channel $2$ and the channel $2$; $6$, a sleeve; $7$, a land portion of the sleeve $6$; $8$, an edge of the land portion $7$; and $9$, a channel adjacent to the land portion $7$.

FIGS. 7A and 7B illustrate the flows of a fluid when the throttle portion described above is throttled during a valve shutoff operation, in which a streamline represented by an arrow A indicates a portion where the flow rate is high, and streamlines represented by arrows B as vortices indicate vortex flows produced by the fluid burble phenomenon.

This phenomenon occurs because the angles $\theta_1$ and $\theta_2$ are so large as to exceed a burble limit angle which is generally said to be 5° to 7°. For this reason, taking into account these situations, a demand has arisen for a rotary fluid control valve device of the above sort in which fluid noise generated during throttling is reduced as low as possible.

SUMMARY OF THE INVENTION

It is, therefore, a principal object of the present invention to provide a fluid control valve device capable of preventing a burble phenomenon of a fluid occurring in a throttle portion during a throttling action to settle a flow, thereby reducing fluid noise as low as possible.

In order to achieve the above object of the present invention, there is provided a rotary fluid control valve device comprising a rotor and a sleeve, which are assembled to rotate relative to each other, and in slidable contact surfaces of which a plurality of channels to be allowed to communicate with an input port, a return port, and output ports are formed in a circumferential direction of the rotor and the sleeve so as to be selectively connected or disconnected by land portions between the channels, wherein chamfers are formed in both ends of the land portions formed between adjacent channels of the rotor, each of the chamfers being formed from an edge to a throttling action end portion of the land portion of the rotor by at least one flat acting surface and a curved acting surface connected to the flat acting surface, and the curved acting surface of the chamfer is formed to have a smooth continuous curved surface with a radius of curvature which decreases gradually from a connection portion with respect to the flat acting surface to a point at which the curved acting surface connects to an outer diameter portion of the rotor.

BRIEF DESCRIPTION OF THE DRAWINGS

FIG. 3 is a schematic sectional view showing a power steering main body of a power steering apparatus to which the fluid control valve device according to the present invention is suitably applicable;

DESCRIPTION OF THE PREFERRED EMBODIMENTS

Figure 1:
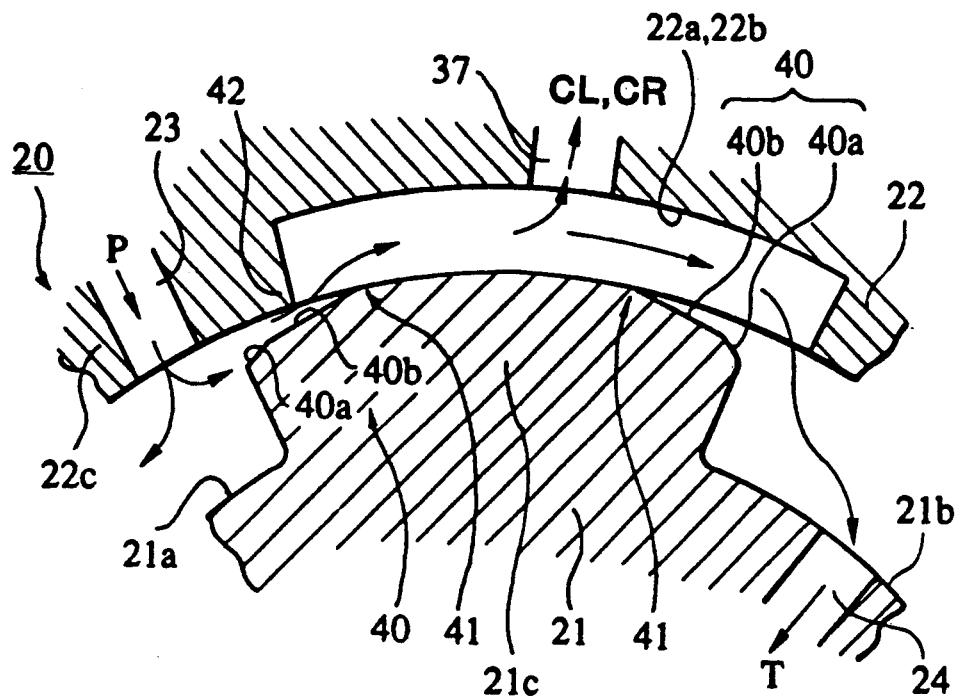
FIG. 1 is a sectional view showing a main part of the first embodiment of a fluid control valve device according to the present invention, for explaining the relationship between a rotor and a sleeve.

FIGS. 1 to 4 show an embodiment of a fluid control valve device according to the present invention, in which the device of the present invention is used as a rotary flow path switching valve 20 in a power steering main body of a power steering apparatus illustrated in FIG. 3.

A schematic arrangement of the power steering main body of the power steering apparatus to which the present invention is applied will be briefly described first with reference to FIG. 3. Referring to FIG. 3, reference numeral 11 denotes a stub shaft as an input shaft coupled to a steering wheel (not shown); and 12, a pinion shaft as an output shaft coupled to the inner end (left end) portion of the stub shaft 11 via a torsion bar 13 and having a pinion 12a to be meshed with rack teeth 14a formed on a rack 14 constituting a steering link mechanism (not shown). A safety spline portion 15 constituted by projections and grooves is interposed between the two shafts 11 and 12, as a failsafe mechanism for allowing a relative rotational displacement between them within the range of a predetermined angle by using torsion of the torsion bar 13.

Note that the inner end of the torsion bar 13 is forcibly inserted and fixed in the pinion shaft 12 and its outer end is extended to the outer end (right end) portion of the stub shaft 11 through the shaft 11 and fixed by a coupling pin 13a inserted into a pin insertion hole formed in alignment with the torsion bar 13 in a serration portion 11a of the stub shaft 11 which is coupled to the steering wheel side.

Figure 4:
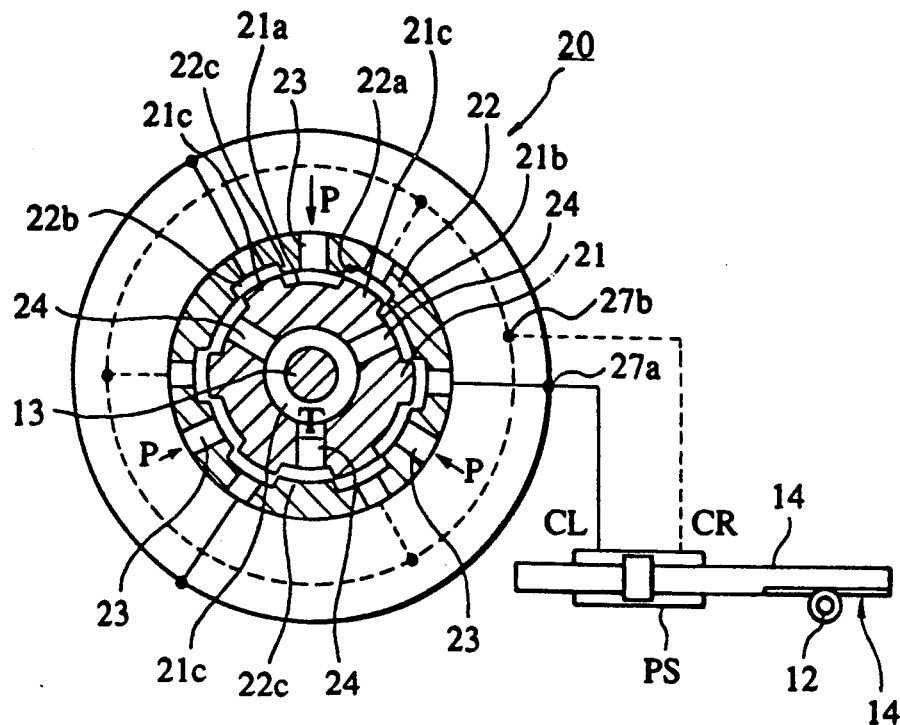
FIG. 4 is a schematic view for explaining structures of a rotary flow path switching valve and a power cylinder shown in FIG. 3.

In a body (housing) 16 constituting the power steering main body, a rotor 21 and a sleeve 22 constituting the rotary flow path switching valve 20 are formed integrally with the inner ends of the shafts 11 and 12, respectively. The rotor 21 and the sleeve 22 are so arranged as to rotationally displace relative to each other to perform flow path switching between the side of an oil pump P and an oil tank T (neither are shown) and the side of left and right chambers CL and CR of a power cylinder PS as shown in FIG. 4. Note that the rotor 21 is formed integrally with the stub shaft 11, and the sleeve 22 is coupled integrally with the pinion shaft 12 via a pin. The rotor 21 and the sleeve 22 thus formed are so assembled as to enable a relative rotational displacement between them and incorporated in a valve housing of the body 16.

In this embodiment, the rotor 21 and the sleeve 22 constituting this rotary flow path switching valve 20 and a hydraulic circuit arrangement in the valve housing (body) 16 are well known to those skilled in the art. That is, as is apparent from FIG. 4, a plurality of recessed channels 21a and 21b, and 22a and 22b are formed at predetermined intervals in the circumferential direction in the outer circumferential surface (slidable contact surface) of the rotor 21 and the inner circumferential surface (slidable contact surface) of the sleeve 22, respectively, which are in slidable contact with each other. In addition, a plurality of passage holes (fluid supply holes 23 and fluid discharge holes 24) are formed in arbitrary positions of the rotor 21 and the sleeve 22, respectively. These channels 21a, 21b, 22a, and 22b and the like are selectively connected or disconnected to control switching between flow paths in the hydraulic circuit as needed.

In FIG. 3, reference numerals 25 and 26 denote an input port for supplying a pressure oil from the oil pump P and a return port for returning the pressure oil to the oil tank T, respectively; and 27A and 27B, left and right output ports connected to the left and right cylinder chambers CL and CR of the power cylinder, respectively.

In addition, as can be seen from FIGS. 3 and 4, a supply-side annular channel 30, a return-side annular channel 31, and left and right output-side annular channels 32 and 33 to be allowed to communicate with the above-mentioned ports are formed in the outer circumferential surface of the sleeve 22 at arbitrary positions offset from one another in the axial direction. The annular channels 30 and 31 are connected to a port hole 25a constituting the input port 25 and a port hole 26a constituting the return port 26, respectively, and the annular channels 32 and 33 are connected to respective port holes of the output ports.

The pressure oil from the pump P flows from the input port 25 into the input port-side channel 21a of the rotor 21 through the supply-side annular channel 30 and the fluid supply hole 23 of the sleeve 22.

The pressure oil flowing from the channel 21a to the return port-side channel 21b of the rotor 21, which communicates with the channel 21a in the circumferential direction through the channels 22a and 22b of the sleeve 22, is introduced into the rotor 21 from the fluid discharge hole 24 formed in the rotor 21.

The pressure oil thus introduced into the rotor 21 is flowed to the return-side annular channel 31 through a fluid discharge hole 34 formed at a position offset from the fluid discharge hole 24 in the axial direction of the rotor 21, an annular space 35 defined between the rotor 21 and the sleeve 22, and a fluid discharge hole 36 formed in the sleeve 22, and is returned to the tank T from the return port 26.

When the rotor 21 and the sleeve 22 are rotationally displaced relative to each other in either direction, the above-mentioned return flow path is disconnected, and the pressure oil is supplied to one of the left and right power cylinder chambers, while the other passage system is connected to the return flow path side, through the left and right output-side channels, channel holes 37 (one of them is shown), the output-side annular channels 32 and 33, and the output ports 27A and 27B.

According to the present invention, the fluid control valve device as the rotary flow path switching valve 20 for use in the power steering apparatus described above comprises the sleeve 22 and the rotor 21 which are so assembled as to rotate relative to each other and have a plurality of channels 22a and 22b, and 21a and 21b, respectively, formed in the circumferential direction in their respective slidable contact surfaces so as to be selectively connected to or disconnected from one of the input port 25 and the return port 26, and the output ports 27A and 27B, respectively.

Figure 2:
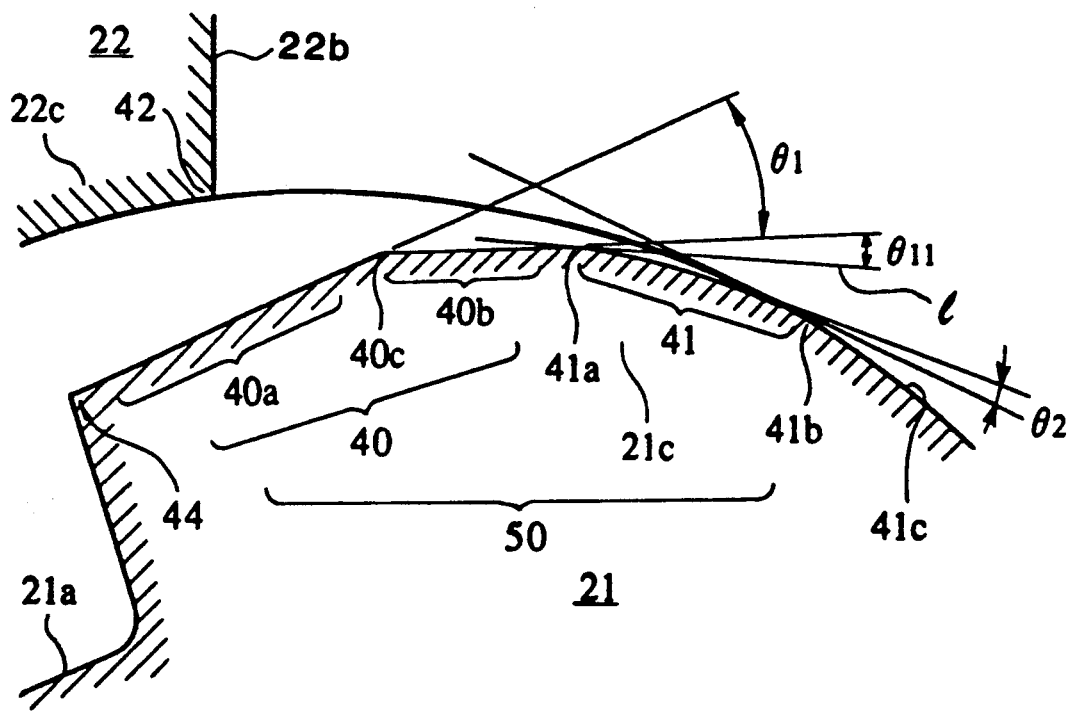
FIG. 2 is an enlarged sectional view for explaining the relationship between a land portion on the rotor side and a land portion on the sleeve side shown in FIG. 1.

In the above arrangement, as shown in FIG. 2, in each of two end portions of a land portion 21c formed between the channels 21a and 21b of the rotor 21, and in a region from an edge 44 to a throttling action end position of the land portion 21c of the rotor 21, first and second flat acting surfaces 40a and 40b and a curved acting surface 41, which is connected to the second acting surface 40b, are formed to constitute a throttle portion 50 as a chamfer. That is, the first and second flat acting surfaces 40a and 40b, which are brought into slidable contact with an edge 42 of a land portion 22c of the sleeve 22 to perform a throttling action, are formed such that an angle $\theta_1$ is defined between them, thereby forming a multistage chamfer portion 40. The curved acting surface 41 is formed to have a smooth continuous curved surface with a radius of curvature which decreases gradually from a connection point 41a with respect to the second acting surface 40b to a connection point 41b with an outer diameter portion 41c of the rotor 21.

In other words, according to the present invention, in order to reduce a fluid noise generation level during a steering operation, it is possible to decrease extremely, in the vicinity of the throttling action end portion, an angle $\theta_{11}$ defined between the second acting surface 40b and a tangent l at the connection point 41a between the second acting surface 40b and the curved acting surface 41, and an angle $\theta_2$ defined between a tangent at the connection point 41b with respect to the outer diameter portion 41c of the rotor and a curved surface near this point. In addition, since the smooth continuous surface is formed from the connection point 41a with respect to the second acting surface 40b to the point 41b described above such that its radius of curvature decreases gradually in this direction, an angle defined between the front and back acting surfaces in this region can also be made very small. This consequently prevents a burble phenomenon of a fluid.

In this case, according to the present invention, it is desirable that the angles $\theta_{11}$, $\theta_2$, and so on associated with the curved acting surface 41 formed from the connection point 41a with respect to the second acting surface 40b in the multistage chamfer portion 40 to the outer diameter portion 41c of the rotor be a burble limit (5° to 7° or less) of a fluid or less.

The shape of the throttle portion 50 serving as the chamfer, which is the characteristic feature of the present invention, is formed on both the end portions of all the land portions 21c of the rotor 21. This makes it possible to completely achieve the object of the present invention.

Figure 5:
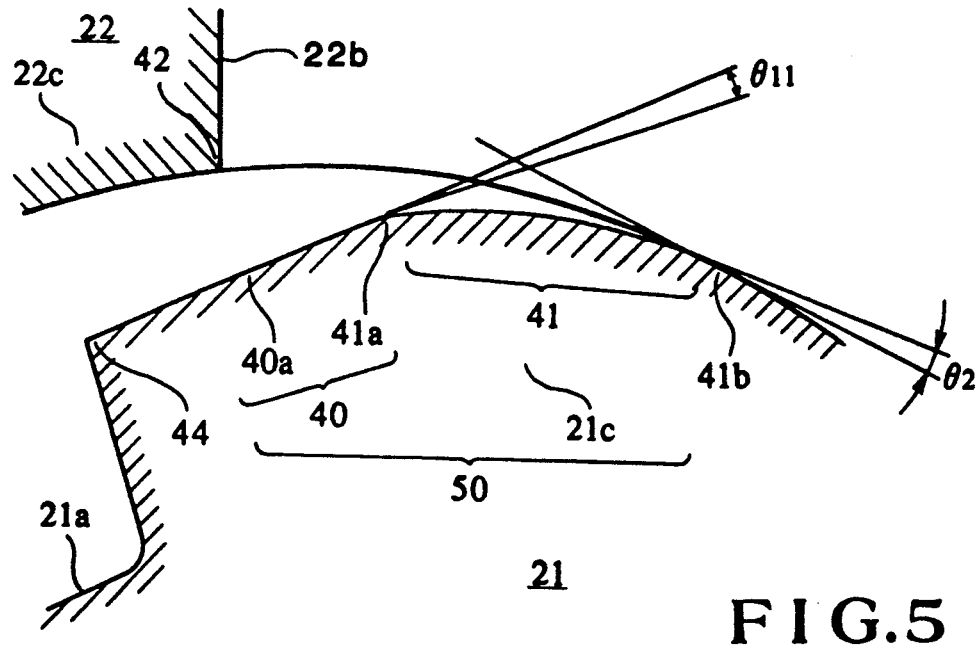
FIG. 5 is an enlarged sectional view showing a main part of another embodiment of the present invention.
Figure 6:
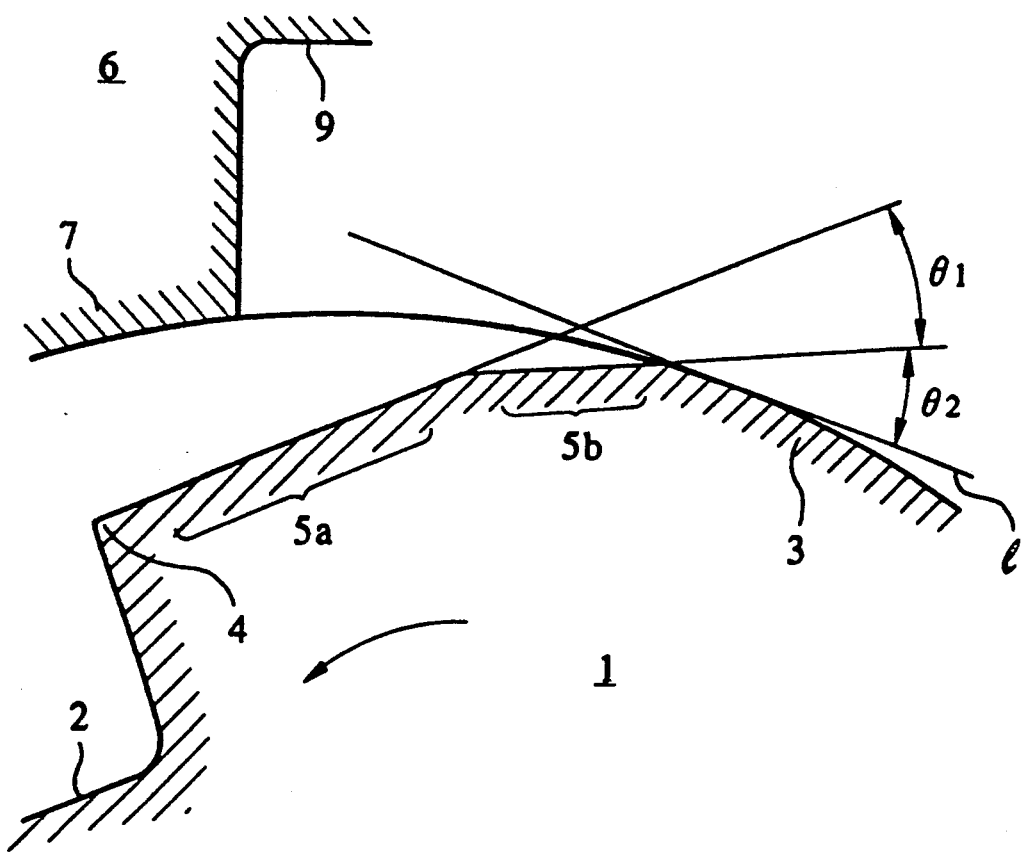
FIG. 6 is a schematic sectional view showing, in an enlarged scale, a conventional example of an edge of a land portion on a rotor side in a fluid control valve device.
Figure 7A:
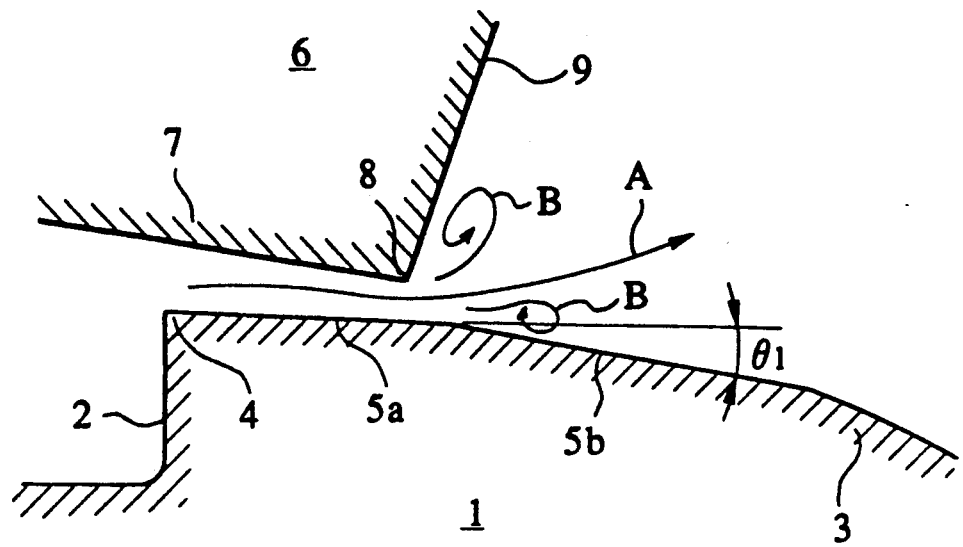
FIGS. 7A and 7B are schematic views for explaining conditions of streamlines of a fluid passing through a throttle portion during a flow path shutoff operation.
Figure 7B:
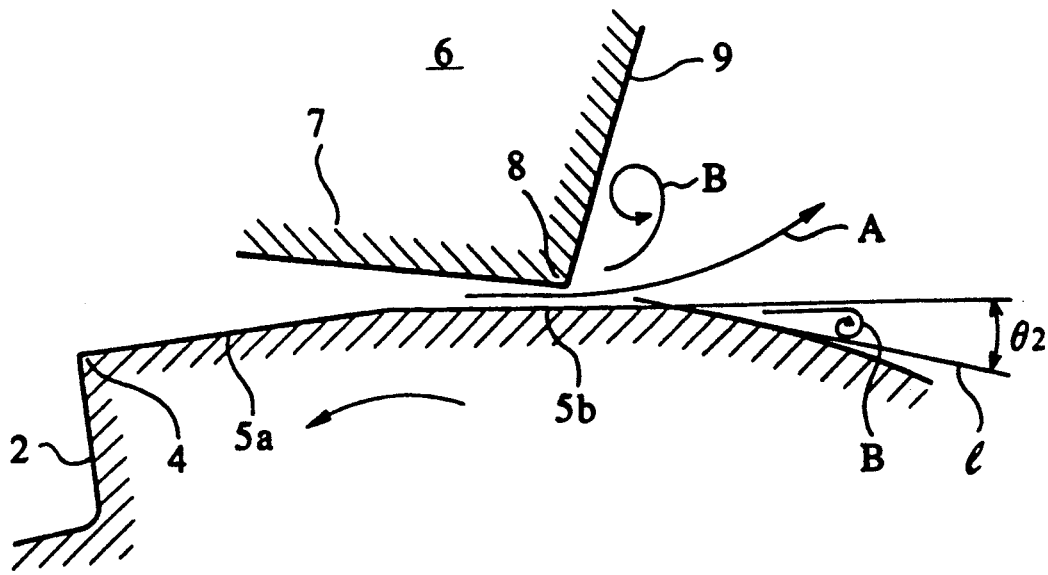

In the above embodiment, following the two-stage flat chamfer portion 40 constituted by the first and second acting surfaces 40a and 40b as flat acting portions, the curved acting surface 41 is continuously formed. As shown in FIG. 5, however, the curved acting surface 41 may be formed directly continuous with the first acting surface 40a. It will be readily understood that with this arrangement also, the fluid burble phenomenon can be prevented to reduce fluid noise in the same manner as in the above embodiment.

The curved acting surface 41 as described above easily causes variations in shutoff timing when formed by buffing or deflashing with a poor processing precision. However, a chamfering machine can process a curved portion in succession to a flat portion in processing a chamfer portion. Therefore, it is possible to obtain a uniform curved surface and a uniform shutoff timing at the connection point 41b with respect to the outer diameter portion of the rotor 21, i.e., at the throttling action end portion. This results in an advantage in that the fluid noise can be suppressed more effectively.

Note that the present invention is not limited to the structure of the above embodiment but the shape, the structure, and the like of each part of the rotary flow path switching valve 20 as the fluid control valve device can be arbitrarily modified and changed, so various modifications are possible.

Note also that in the above embodiment, the present invention is used as the rotary flow path switching valve 20 in a power steering apparatus. It will be readily understood, however, that the present invention is not limited to this application but can be used as rotary fluid control valve devices in a wide variety of fields.

As has been described above, according to the fluid control valve device of the present invention, in each of two end portions of a land portion formed between channels which are formed in the slidable contact surface of a rotor assembled in a sleeve so as to be rotationally displaced relative to the sleeve, and are used to connect or disconnect flow paths, a chamfer is formed from the edge to a throttling action end portion of the land portion of the rotor to have a shape with at least one flat acting surface and a curved acting surface continuous to the flat acting surface. In addition, this curved acting surface of the chamfer is formed to have a smooth continuous curved surface with a radius of curvature which decreases gradually from a connection point with respect to the flat acting surface to a point at which it is connected to the outer diameter portion of the rotor. As a result, various excellent effects enumerated below can be obtained regardless of the simple structure.

That is, the present invention has an excellent effect of preventing a burble phenomenon of a fluid during a throttling action to suppress occurrence of turbulent flows or vortex flows, thereby largely reducing fluid noise caused by cavitation as compared with conventional systems.

In addition, although the curved acting surface readily causes variations in shutoff timing if formed by buffing or deflashing with a poor processing precision, the present invention makes use of a chamfering machine capable of processing a curved surface in succession to a flat surface in processing a chamfer portion. This makes it possible to obtain a uniform curved surface and a uniform shutoff timing at the connection point at which the curved surface is connected to the outer diameter portion of the rotor, i.e., at the throttling action end portion. The result is an advantage that the fluid noise can be suppressed more effectively.

What is claimed is:

1. A rotary fluid control valve device comprising a rotor and a sleeve, which are assembled to rotate relative to each other, and in slidable contact surfaces of which a plurality of channels to be allowed to communicate with an input port, a return port, and output ports are formed in a circumferential direction of said rotor and said sleeve so as to be selectively connected or disconnected by land portions between said channels, wherein chamfers are formed in both ends of said land portions formed between adjacent channels of said rotor, each of said chamfers being formed from an edge to a throttling action end portion of said land portion of said rotor by at least one flat acting surface and a curved acting surface connected to said flat acting surface, and said curved acting surface of said chamfer is formed to have a smooth continuous curved surface with a radius of curvature which decreases gradually from a connection portion with respect to said flat acting surface to a point at which said curved acting surface connects to an outer diameter portion of said rotor.

2. A device according to claim 1, wherein said chamfer has a plurality of acting surfaces, and angles defined between adjacent surfaces are set to decrease gradually from the edge to the center of said land portion.

3. A device according to claim 2, wherein an angle defined between a second acting surface from the edge of said land portion of said chamfer and a third acting surface therefrom and subsequent angles of action are set to not more than a burble limit angle of a fluid.

* * * * *